US011892850B2

(12) United States Patent
Takahashi et al.

(10) Patent No.: US 11,892,850 B2
(45) Date of Patent: Feb. 6, 2024

(54) AUTONOMOUS WORK MACHINE, METHOD OF CONTROLLING THE SAME, AND STORAGE MEDIUM

(71) Applicant: HONDA MOTOR CO., LTD., Tokyo (JP)

(72) Inventors: Hiroto Takahashi, Wako (JP); Makoto Yamamura, Wako (JP); Takamasa Udagawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 374 days.

(21) Appl. No.: 17/314,817

(22) Filed: May 7, 2021

(65) Prior Publication Data

US 2021/0263523 A1    Aug. 26, 2021

Related U.S. Application Data

(63) Continuation of application No. PCT/JP2018/042331, filed on Nov. 15, 2018.

(51) Int. Cl.
G05D 1/02       (2020.01)
G06V 20/56      (2022.01)
(Continued)

(52) U.S. Cl.
CPC ......... *G05D 1/0219* (2013.01); *A01D 34/008* (2013.01); *G05D 1/0231* (2013.01);
(Continued)

(58) Field of Classification Search
CPC ............... G05D 1/0219; G05D 1/0231; G05D 2201/0208; G05D 1/0234; G05D 1/0251;
(Continued)

(56) References Cited

U.S. PATENT DOCUMENTS 8,275,506 B1 * 9/2012 Bishel ..................... G01S 13/87
                                                       701/25
9,063,547 B2   6/2015 Yamamura et al.
(Continued)

FOREIGN PATENT DOCUMENTS

EP       2806325 A2     11/2014
JP    2013165588 A       8/2013
(Continued)

OTHER PUBLICATIONS

International Search Report for PCT/JP2018/042331 dated Feb. 5, 2019.

*Primary Examiner* — Harry Y Oh
(74) *Attorney, Agent, or Firm* — Thomas| Horstemeyer, LLP

(57) ABSTRACT

An autonomous work machine that works on a target object in a work area while performing an autonomous travel operation in the work area, comprises an obtainment unit configured to obtain a distribution the target object of the work, a determination unit configured to determine a turn direction of the autonomous work machine in accordance with the distribution of the target object, and a control unit configured to control the autonomous work machine so that the autonomous work machine will turn in the turn direction at a turn timing during the autonomous travel operation.

13 Claims, 7 Drawing Sheets

(51) Int. Cl.
*A01D 34/00* (2006.01)
*A01D 101/00* (2006.01)

(52) U.S. Cl.
CPC .......... *G06V 20/56* (2022.01); *A01D 2101/00* (2013.01); *G05D 2201/0208* (2013.01)

(58) Field of Classification Search
CPC ... A01D 34/008; A01D 2101/00; G06V 20/56
See application file for complete search history.

(56) References Cited

U.S. PATENT DOCUMENTS

| | | | |
|---|---|---|---|
| 9,268,331 B2 | | 2/2016 | Abramson et al. |
| 9,939,812 B2 | | 4/2018 | Yamamura |
| 10,705,533 B1 | * | 7/2020 | Bishel .................. G05D 1/0231 |
| 2012/0247510 A1 | * | 10/2012 | Chen .................... G05D 1/0219 |
| | | | 134/18 |
| 2013/0211646 A1 | | 8/2013 | Yamamura et al. |
| 2014/0324269 A1 | | 10/2014 | Abramson et al. |
| 2016/0282867 A1 | * | 9/2016 | Yamamura ........... G05D 1/0278 |
| 2019/0141887 A1 | * | 5/2019 | Matsuda ............... G06T 7/0012 |
| | | | 56/255 |
| 2019/0313576 A1 | * | 10/2019 | Haneda ................ A01D 34/008 |

FOREIGN PATENT DOCUMENTS

| | | | |
|---|---|---|---|
| JP | 2016186749 A | 10/2016 | |
| JP | 2018109848 A | 7/2018 | |
| WO | 2020100264 A1 | 5/2020 | |

* cited by examiner

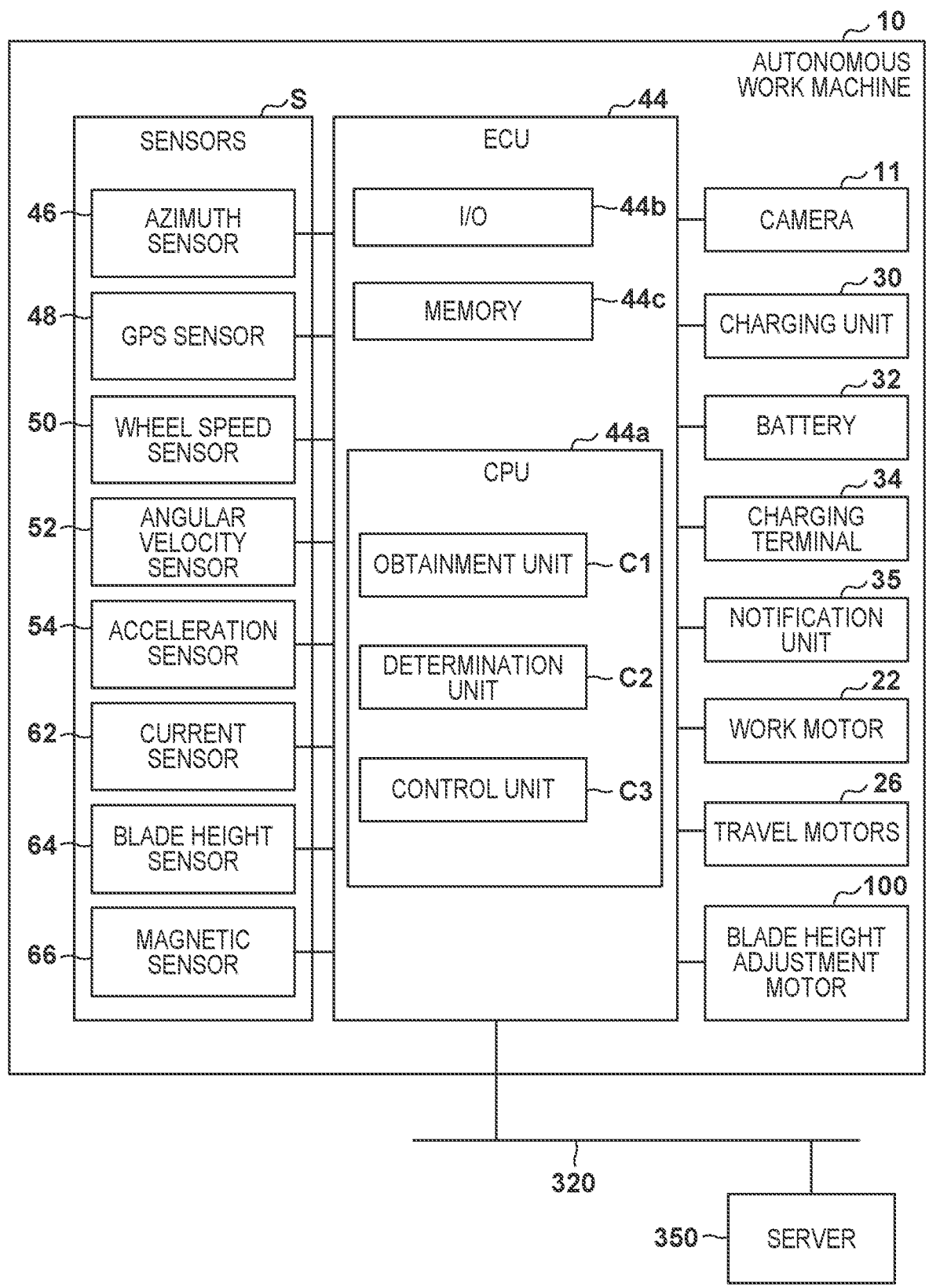

AUTONOMOUS WORK MACHINE, METHOD OF CONTROLLING THE SAME, AND STORAGE MEDIUM

CROSS-REFERENCE TO RELATED APPLICATION(S)

This application is a continuation of International Patent Application No. PCT/JP2018/042331 filed on Nov. 15, 2018, the entire disclosure of which is incorporated herein by reference.

BACKGROUND OF THE INVENTION

Field of the Invention

The present invention relates to an autonomous work machine, a method of controlling the same, and a storage medium.

Description of the Related Art

PTL 1 discloses, for example, an autonomous work machine that detects a magnetic field strength of an area wire arranged on the perimeter of a work area and travels while detecting an interval distance from the area wire based on the detected magnetic field strength.

CITATION LIST

Patent Literature

PTL 1: Japanese Patent Laid-Open No. 2013-165588

SUMMARY OF THE INVENTION

Technical Problem

However, since a turn direction (whether to turn in the left direction or the right direction with respect to the direction of travel) and a turn angle during turning are set randomly in the arrangement disclosed in PTL 1, when the autonomous work machine gets close to a boundary of a work area, the autonomous work machine may turn toward a worked area where the lawn has already been mowed. The arrangement disclosed in PTL 1 does not consider turn control in accordance with the distribution of a target object, and the autonomous work machine may not be able to efficiently operate in a work area in some cases.

In consideration of the above problem, the present invention provides a technique that can control the autonomous work machine so that the autonomous work machine will turn in a direction in corresponding to the distribution of a target object.

Solution to Problem

According to one aspect of the present invention, there is provided an autonomous work machine that works on a target object in a work area while performing an autonomous travel operation in the work area, comprising: an obtainment unit configured to obtain a distribution the target object of the work; a determination unit configured to determine a turn direction of the autonomous work machine in accordance with the distribution of the target object; and a control unit configured to control the autonomous work machine so that the autonomous work machine will turn in the turn direction at a turn timing during the autonomous travel operation.

Advantageous Effects of Invention

According to the present invention, control can be performed so that an autonomous work machine will turn in a direction corresponding to the distribution of a target object so that work efficiency can be improved.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

FIG. 2 is a block diagram showing the relationship of inputs/outputs of an electronic control unit (ECU) that controls the autonomous work machine according to the embodiment;

DESCRIPTION OF EMBODIMENTS

First Embodiment

An embodiment of the present invention will be described hereinafter with reference to the accompanying drawings. Components described in the embodiment are merely exemplary and are not limited by the following embodiment.

(Outline of Autonomous Work Machine)

Figure 1A:
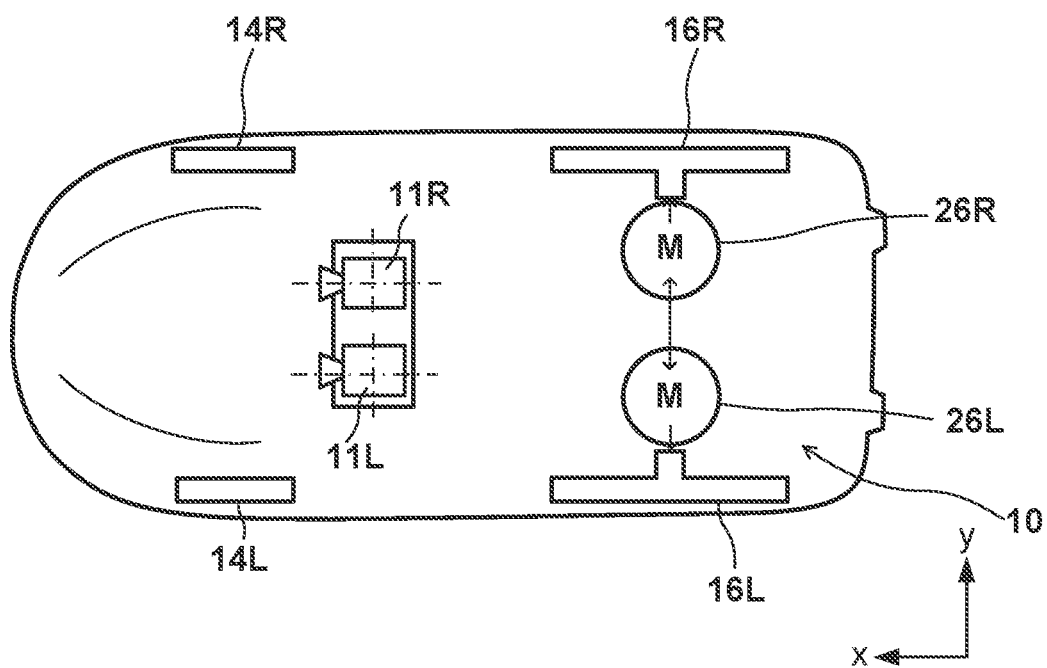
FIG. 1A is a schematic view in which an autonomous work machine according to an embodiment is viewed from above.
Figure 1B:
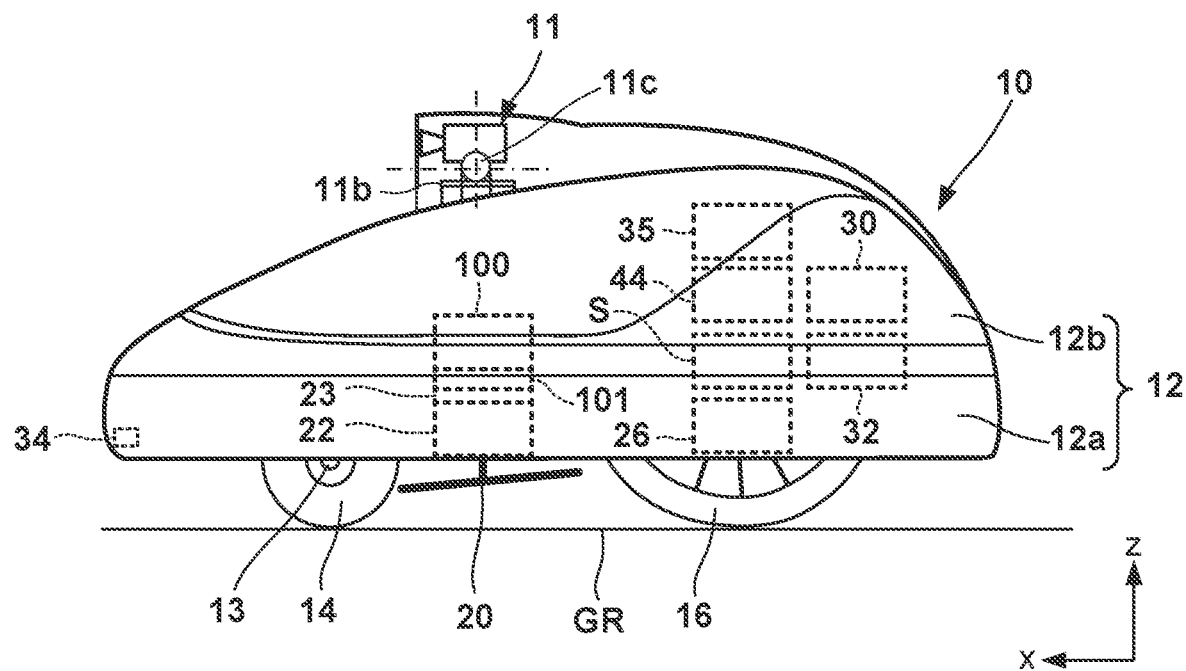
FIG. 1B is a schematic view in which the autonomous work machine according to the embodiment is viewed from the side.

FIG. 1A is a schematic view in which an autonomous work machine according to the first embodiment is viewed from above, and FIG. 1B is a schematic view in which the autonomous work machine is viewed from the side. In the following description, a direction of travel (vehicle longitudinal direction: x direction) of the autonomous work machine in a side view, a lateral direction (vehicle width direction: y direction) orthogonal to the direction of travel, and a perpendicular direction (z direction) orthogonal to the direction of travel and the lateral direction are defined as a front-and-rear direction, a left-and-right direction, and a vertical direction, respectively, and the arrangement of each component will be explained in accordance with these directions.

In FIGS. 1A and 1B, reference numeral 10 denotes an autonomous work machine that autonomously travels a work area and works on a target object in the work area. The autonomous work machine 10 can function as, for example, a lawn mower, a weeder, snow removal equipment, a golf ball collector, a tiller, or the like that can work while autonomously traveling in a work area. However, the example of the autonomous work machine is merely an example, and the present invention is applicable to other kinds of work machines. In the following description, the arrangement of a lawn mower whose work area is a plot of lawn will be exemplified to describe an embodiment of the present invention.

As shown in FIGS. 1A and 1B, the autonomous work machine 10 includes cameras 11, a vehicle body 12, a stay 13, front wheels 14, rear wheels 16, a blade 20, a work motor 22, a motor holding member 23, a blade height adjustment motor 100, and a translation mechanism 101. The autonomous work machine 10 also includes travel motors 26, various kinds of sensors S, an electronic control unit (ECU) 44, a charging unit 30, a battery 32, a charging terminal 34, and a notification unit 35.

Each camera 11 of the autonomous work machine 10 captures the work area. The image capturing range of each camera 11 is set to the front of the autonomous work machine 10. However, the image capturing range is not limited to this, and a camera that is capable of capturing a range of 360° can also be used. The ECU 44 can use the cameras 11 to obtain information of the external world of the autonomous work machine 10 and use images captured by the cameras 11 (a left camera 11L and a right camera 11R) with a parallax between a plurality of cameras to calculate and obtain information of the distance between the autonomous work machine 10 and an object in front of the autonomous work machine.

The vehicle body 12 of the autonomous work machine 10 includes a chassis 12a and a frame 12b attached to the chassis 12a. Two front wheels 14 (a left front wheel 14L and a right front wheel 14R) as left and right small-diameter wheels are fixed to the front part of the chassis 12a via the stay 13. Two rear wheels 16 (a left rear wheel 16L and a right rear wheel 16R) as left and right large-diameter wheels are attached to the rear part of the chassis 12a.

The blade 20 is a rotary blade for lawn mowing attached near the central position of the chassis 12a. The work motor 22 is an electric motor arranged above the blade 20. The blade 20 is connected to and rotated by the work motor 22. The motor holding member 23 holds the work motor 22. The rotation of the motor holding member 23 is regulated with respect to the chassis 12a. In addition, the vertical movement of the motor holding member 23 is permitted by a combination of a guide rail and a slider which can move vertically by being guided by the guide rail.

The blade height adjustment motor 100 is a motor for adjusting the height of the blade 20 in the vertical direction from a ground surface GR. The translation mechanism 101 is connected to the blade height adjustment motor 100, and converts the rotation of the blade height adjustment motor 100 into a vertical translational movement. The translation mechanism 101 is also connected to the motor holding member 23 for holding the work motor 22.

The rotation of the blade height adjustment motor 100 is converted into the translational movement (vertical movement) by the translation mechanism 101, and this translational movement is transmitted to the motor holding member 23. The translational movement (vertical movement) of the motor holding member 23 causes the work motor 22 held by the motor holding member 23 to translationally move (vertically move). The height of the blade 20 from the ground surface GR can be adjusted by the vertical movement of the work motor 22.

The travel motors 26 (a left travel motor 26L and a right travel motor 26R) are two electric motors (motors) attached to the chassis 12a of the autonomous work machine 10. The two electric motors are connected to the left and right rear wheels 16. The left and right wheels are independently rotated forward (rotated in an advancing direction) or rotated backward (rotated in a reversing direction) by using the front wheels 14 as driven wheels and the rear wheels 16 as driving wheels. This allows the autonomous work machine 10 to move in various directions.

For example, if the rotation speed of the right rear wheel 16R is set higher than the rotation speed of the left rear wheel 16L when the left and right rear wheels 16 are to be rotated forward, the work vehicle 10 can be made to turn leftward at a turn angle corresponding this speed difference. On the other hand, if the rotation speed of the left rear wheel 16L is set higher than the rotation speed of the right rear wheel 16R, the work vehicle 10 can be made to turn rightward at a turn angle corresponding this speed difference. Also, if one of the left and right rear wheels 16 is rotated forward and the other is rotated backward while both are rotated at the same speed, the work vehicle 10 can be made to rotate at the current spot (on-spot rotation).

The charging terminal 34 is a charging terminal installed in the front end position of the frame 12b in the front-and-rear direction. The charging terminal 34 can receive power from a charging station when connected to a corresponding charging terminal of the charging station. The charging terminal 34 is connected to the charging unit 30 by a wiring line, and the charging unit 30 is connected to the battery 32. The work motor 22, the travel motors 26, and the blade height adjustment motor 100 are also connected to the battery 32, and receive power from the battery 32.

The ECU 44 is an electronic control unit including a microcomputer formed on a circuit board, and controls the operation of the autonomous work machine 10. Details of the ECU 44 will be described later. The notification unit 35 notifies a user of the occurrence of an abnormality in a case in which an abnormality has occurred in the autonomous work machine 10. For example, notification can be performed by sound or display. Alternatively, notification can be performed by outputting an abnormality generation notification to an external device which is wirelessly connected to the autonomous work machine 10. The user can be notified of the occurrence of an abnormality through the external device.

(Control Block Diagram)

FIG. 2 is a block diagram showing the relationship of inputs/outputs of the electronic control unit (ECU) that controls the autonomous work machine 10. As shown in FIG. 2, the ECU 44 includes a CPU 44a, an I/O 44b, and a memory 44c. The memory 44c functions as a storage unit and is formed by a ROM (Read Only Memory), an EEPROM (Electrically Erasable Programmable Read Only Memory), a RAM (Random Access Memory), and the like.

The memory 44c stores a work schedule of the autonomous work machine 10, map information about a work area, and various programs for controlling the operation of the autonomous work machine 10, and an area map that indicates the shape of the work area. The autonomous work machine 10 can perform predetermined work while autonomously traveling in a work area based on an area map of the work area. The ECU 44 can operate as each processing unit for implementing the present invention by reading out and executing a program stored in the memory 44c.

The ECU 44 is connected to the various kinds of sensors S. The sensors S include an azimuth sensor 46, a GPS sensor 48, a wheel speed sensor 50, an angular velocity sensor 52, an acceleration sensor 54, a current sensor 62, a blade height sensor 64, and magnetic sensors 66.

The azimuth sensor 46 and the GPS sensor 48 are sensors for obtaining information of the direction and the position of the autonomous work machine 10. The azimuth sensor 46 detects the azimuth corresponding to the terrestrial magnetism. The GPS sensor 48 receives radio waves from GPS satellites and detects information indicating the current position (the latitude and the longitude) of the autonomous work machine 10.

The wheel speed sensor 50, the angular velocity sensor 52, and the acceleration sensor 54 are sensors for obtaining information on the state of the movement of the autonomous work machine 10. The wheel speed sensor 50 detects the wheel speeds of the left and right rear wheels 16. The angular velocity sensor 52 detects the angular velocity around the vertical axis (the z-axis in the perpendicular direction) in the barycentric position of the autonomous work machine 10. The acceleration sensor 54 detects accelerations in the directions of three perpendicular axes, that is, the x-, y-, and z-axes, which act on the autonomous work machine 10.

The current sensor 62 detects the current consumption (power consumption) of the battery 32. The detection result of the current consumption (power consumption) is saved in the memory 44c of the ECU 44. When a predetermined power amount is consumed and the power amount stored in the battery 32 becomes equal to or lower than a threshold value, the ECU 44 executes control to return the autonomous work machine 10 to a charging station ST (FIG. 3) in order to charge the autonomous work machine 10.

The blade height sensor 64 detects the height of the blade 20 from the ground surface GR. The blade height sensor 64 outputs the detection result to the ECU 44. Under the control of the ECU 44, the blade height adjustment motor 100 is driven, and the blade 20 vertically moves, thereby adjusting the height from the ground surface GR.

The magnetic sensors 66 (a right magnetic sensor 66R and a left magnetic sensor 66L) are arranged at symmetrical positions to each other in the left-and-right direction of the autonomous work machine 10, and detect the magnetic field generated by an area wire. Each magnetic sensor outputs a signal indicating the magnitude of the magnetic field (magnetic field strength) to the ECU 44.

The outputs from the various sensors S are input to the ECU 44 via the I/O 44b. Based on the outputs from the various sensors S, the ECU 44 supplies power from the battery 32 to the travel motors 26, the work motor 22, and the height adjustment motor 100. The ECU 44 controls the travel motors 26 by outputting a control value via the I/O 44b, thereby controlling travel of the autonomous work machine 10. The ECU 44 also controls the height adjustment motor 100 by outputting a control value via the I/O 44b, thereby controlling the height of the blade 20. Furthermore, the ECU 44 controls the work motor 22 by outputting a control value via the I/O 44b, thereby controlling the rotation of the blade 20. The I/O 44b can function as a communication interface (communication unit), and can communicate with a server 350 via a network 320.

ECU 44 includes a obtainment unit C1, a determination unit C2, and a control unit C3 as functional components of the CPU 44a for implementing the present invention by reading out and executing various kinds of programs stored in the memory 44c.

The obtainment unit C1 obtains the distribution of a work target object in a work area. The work target object here is grass in lawn mowing work. The cameras 11 capture images of the work area while the autonomous work machine 10 is traveling in the work area. The obtainment unit C1 can obtain the distribution of the target object based on the images captured by the cameras 11. For example, in a worked area where the lawn mowing work has been completed, the distribution of the target object (grass) of the lawn mowing work will be smaller since the grass has been mowed. On the other hand, since the grass has not been mowed in an unworked area where the lawn mowing work has not been completed, the distribution of the target object (grass) will be larger than the worked area.

The appearance of a worked area can be different from the appearance of an unworked area in an image captured by the cameras 11. For example, since the density of an image of an unworked area with long grass will be higher than the density of an image of a worked area with short grass (long grass will seem more dense than short grass), both an unworked area and a worked area can be discriminated by image processing.

The obtainment unit C1 also specifies, based on the track of movement of the autonomous work machine 10 traveling in the work area, a traveled area as a worked area and an untraveled area as an unworked area. The obtainment unit C1 can obtain, based on the result of the specification, the distribution of the work target object. That is, the obtainment unit C1 can obtain the distribution of the work target object such as the fact that the distribution of the work target object (grass) is smaller in a traveled area (worked area) and that the distribution of the work target object (grass) is larger in an untraveled area (unworked area) than in the worked area.

In addition, the obtainment unit C1 can obtain, together with the position information at the time of travel, information of a work load (a load on the blade 20) with respect to a work object (for example, the grass growing in the work area) as a piece of load history information, and obtain the distribution of the work target object based on the load history information. In an area (unworked area) where the grass is long, the work load will become higher than a predetermined threshold since the resistance of the blade 20 at the time of contact with the grass will be high. Also, in an area (worked area) where the grass is short, the work load will be equal to or less than the predetermined threshold since the resistance of the blade 20 at the time of contact with the grass will be lower than that of an unworked area. Based on the load history information, the obtainment unit C1 can specify a position where the work load will be high and a position where the work load will be low in the work area.

The obtainment unit C1 can obtain the distribution of the work target object based on the specification result of the work load. That is, the obtainment unit C1 can obtain, based on a threshold as a reference, the distribution of the work target object such as the fact that the distribution of the work target object (grass) is small in a low work load area (worked area) and that the distribution of the work target object (grass) is larger in a high work load area (unworked area) than in the worked area.

The determination unit C2 determines a turn direction of the autonomous work machine in accordance with the distribution of the target object. Here, the turn direction can be 360° about the autonomous work machine 10 and may be any direction, and the determination unit C2 can determine an arbitrary direction as the turn direction in accordance with the distribution of the target object. The turn direction according to this embodiment is, for example, the left direction or the right direction with respect to the track (advancing direction) of travel or a direction in a 180° turn (reverse turn) with respect to the track of travel. The determination unit C2 can determine a turn angle together with the turn direction in accordance with the distribution of the target object. The determination unit C2 determines the turn direction (for example, the left direction or the right direction or the 180° turn direction) based on at least one of the processing results of various processing operations (the image processing on the images captured by the cameras 11, the track of movement of the autonomous work machine 10, and the processing of the work load (the load on the blade 20)) by the obtainment unit C1. A random angle can be set as the turn angle with respect to one of the left direction and the right direction as the turn direction. In this case, the control unit C3 will control the autonomous work machine 10 so that the autonomous work machine will turn at a random angle in one of the left direction and the right direction determined to be the turn direction at a turn timing during autonomous travel.

The determination unit C2 can also determine, based on the distribution of the target object obtained by the obtainment unit C1, the turn angle in the one of the left direction and the right direction determined to be the turn direction. In this case, the control unit C3 will control the autonomous work machine 10 based on the turn angle and the turn direction which has been determined to be one of the left direction and the right direction by the determination unit C2. As a result, the autonomous work machine can be controlled to turn at a turn angle and in one of the left direction and the right direction as the turn direction in correspondence with the distribution of the target object. Therefore, the work efficiency can be improved.

Alternatively, when the determination unit C2 is to determine the turn direction, if it is determined that the distribution of the work target object is greater on the track on which the autonomous work machine is traveling autonomously than the distribution of the work target object in other areas of the work area, the determination unit C2 can determine, as the turn direction, the direction in the 180° turn (reverse turn) with respect to the advancing direction. In this case, the control unit C3 will control the autonomous work machine 10 based on the turn direction and the turn angle (180°) determined by the determination unit C2. As a result, the autonomous work machine can be controlled to turn in the turn direction (reverse turn) and at the turn angle (180°) corresponding to the distribution of the target object. Therefore, the work efficiency can be improved.

Note that although this embodiment described an example in which one of the left direction and the right direction or a 180° turn is selected as the turn direction, the present invention is not limited to this. The determination unit C2 can determine an arbitrary direction as the turn direction in accordance with the distribution of the target object, and the control unit C3 can control the autonomous work machine 10 based on the arbitrary turn direction and the turn angle determined by the determination unit C2.

Based on the distribution of the target object obtained by the obtainment unit C1, the determination unit C2 determines a direction with a higher distribution of the target object as the turn direction with respect to the direction of travel of the autonomous travel operation.

In addition, based on the distribution of the target object obtained by the obtainment unit C1, the determination unit C2 specifies an area in which the distribution of the target object is biased, and determine a direction in the specified region as the turn direction from the direction of travel of the autonomous travel operation. In a case in which an unworked area (for example, a missed spot area of grass) is concentrated in one spot, the turn direction can be determined so the autonomous work machine will move to this area.

Figure 7:
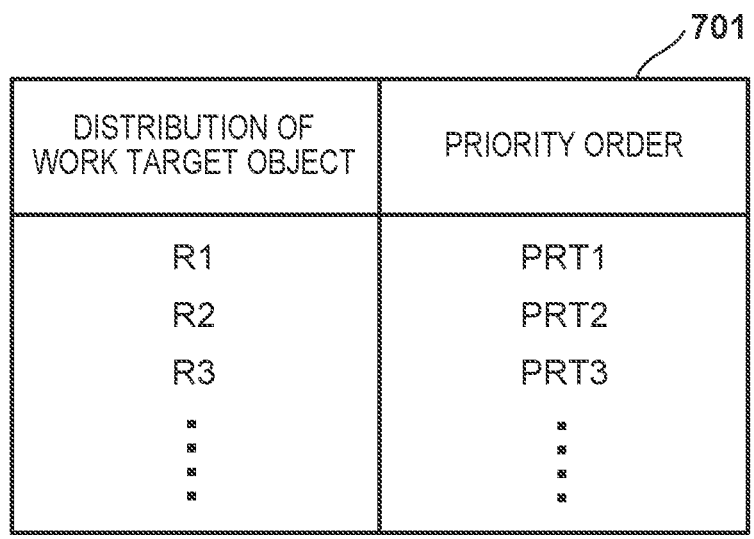
FIG. 7 is a view for explaining a priority order set for a plurality of target object distributions.

If there are a plurality of areas where the distribution of the target object is biased in the work area, the determination unit C2 can set a priority order to each area in accordance with the degree (for example, the degree of the length of the grass or the work load information (the degree of the load)) of the distribution, and determine the turn direction based on the set priority order. FIG. 7 is a view for explaining the priority order set for a plurality of target object distributions. Priority orders PRT1, PRT2, PRT3, . . . have been set to a plurality of target distribution areas R1, R2, R3, . . . , respectively. Based on the set priority order PRT1, the determination unit C2 will determine, as the turn direction, a direction toward the target object distribution area R1 from the current travel track. Next, based on the set priority order PRT2, the determination unit C2 will determine, as the turn direction, a direction toward the target object distribution area R2 from the track of work in the target object distribution area R1. Furthermore, based on the priority order PRT3, the determination unit C2 will determine, as the turn direction, a direction toward the target object distribution area R3 from the track of work in the target object distribution area R2. In this manner, by setting a priority order to the plurality of distribution areas, work on the plurality of distribution areas can be performed efficiently.

In addition, in a case in which an area where the grass has died is determined in the work area based on images obtained by the cameras 11, the determination unit C2 can determine the turn direction and the turn angle by excluding the area where the grass has died from the work target area. That is, in a case in which the target object is determined, based on the image captured by the cameras 11, to be in a state that does not require work, the determination unit C2 can determine the turn direction and the turn angle by excluding, from the area in the work area, the area of the target object determined to be in the state that does not require work. If lawn mowing work is performed on an area where the grass has died, the dying of the grass may be promoted in some cases. However, by excluding the area where the grass has died from the work target area, it will be possible to protect the grass by suppressing the dying of the grass from being promoted. In a similar manner, in a case in which a rabbit hole is present or a barren land with much unevenness is present, the determination unit C2 can determine the turn direction and the turn angle to exclude such an area to avoid becoming stuck.

The control unit C3 controls the autonomous work machine 10 so the autonomous work machine will turn, in the turn direction and the turn angle determined by the determination unit C2, at a turn timing of the autonomous travel operation. In this case, a turn controlled by the control unit C3 includes a case in which the autonomous work machine temporarily stops and turns in the current spot and a case in which the front wheels 14 (14L and 14R) of the autonomous work machine 10 turn at an angle more moderate (moderate turn) than a predetermined angle. The timing at which the autonomous work machine 10 has come close to a predetermined distance to a marker or an area wire for delineating the boundary of the work area will be the turn timing of the autonomous travel operation. In addition, the timing at which the autonomous work machine 10 has come close to a predetermined distance to an obstacle (for example, a rock or the like) in the work area will also be a turn timing of the autonomous travel operation.

<Use Example of Autonomous Work Machine>

Figure 3:
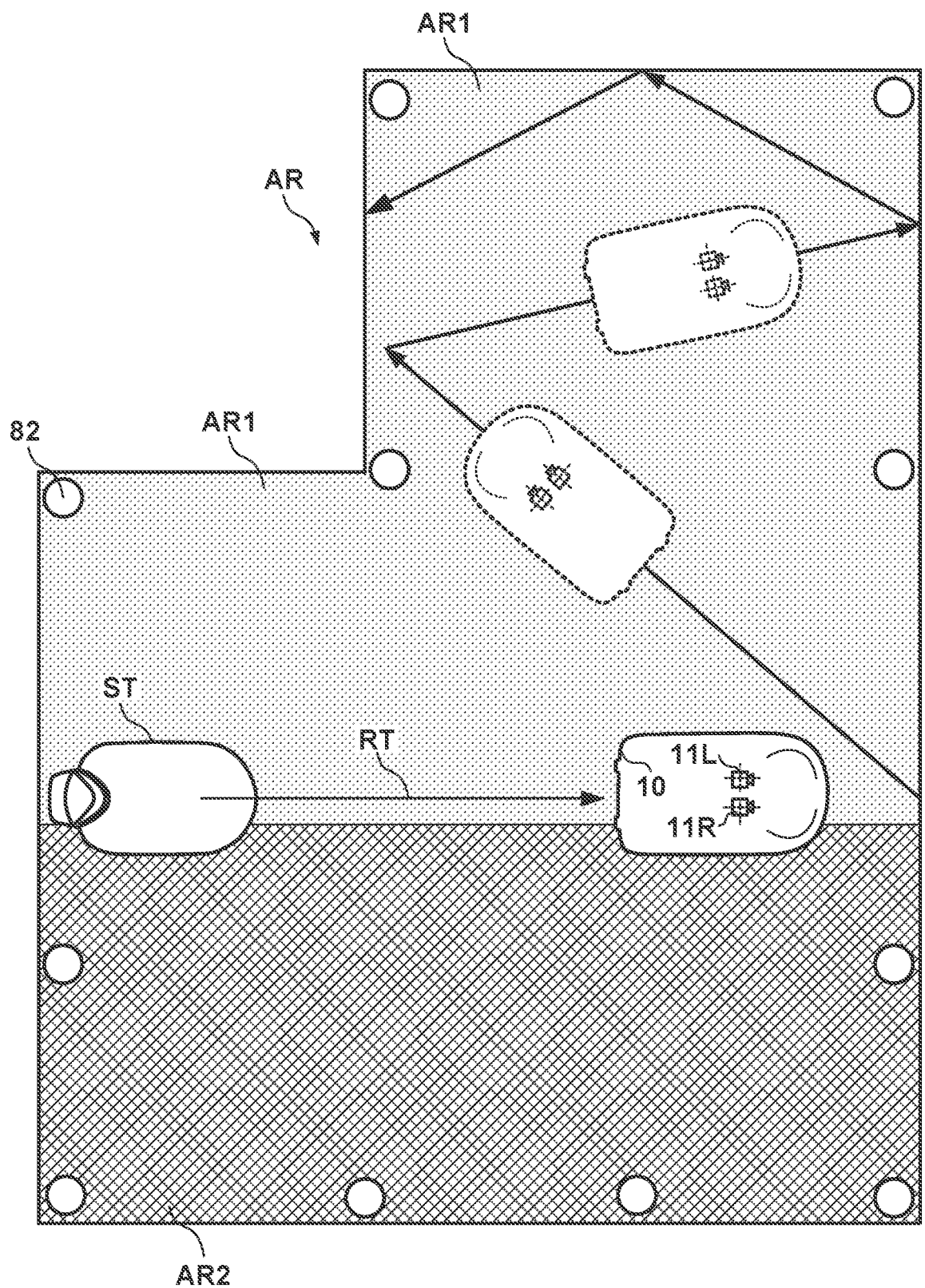
FIG. 3 is a schematic view showing an example of use of an autonomous work machine 10.

FIG. 3 is a schematic view showing an example of the use of the autonomous work machine 10. In FIG. 3, the autonomous work machine 10 performs lawn mowing work in a work area AR (lawn). As shown in FIG. 3, the work area AR is delineated by an area wire or a plurality of markers 82 arranged around the perimeter (boundary) of the work area. Before operating in the work area AR, the ECU 44 of the autonomous work machine 10 recognizes (grasps) the boundary of the work area AR by performing a trace travel along the perimeter of the work area AR based on the result of detecting the area wire or the markers 82. An area map indicating the outer shape of the work area will be generated by the trace travel operation. The autonomous work machine 10 will perform predetermined operations by autonomously traveling in the work area AR in accordance with the generated area map.

The charging station ST for charging the battery 32, which is included in the autonomous work machine 10, is arranged inside the work area AR, and the autonomous work machine 10 that has started moving from the charging station ST will travel in the work area AR based on a predetermined track. The area map includes coordinate information of the work area AR. For example, the two-dimensional coordinates (position information) in the work area AR are defined based on an X direction and a Y direction perpendicular to each other with the charging station ST as the origin. A track RT indicates a path to be traveled by the autonomous work machine 10, and the control unit C3 causes the work machine 1 to perform lawn mowing work while moving on the path RT.

The control unit C3 causes the autonomous work machine 10 to advance straight while performing the lawn mowing work, and sequentially switches, upon detecting the marker 82 at the boundary of the work area AR, the advancing direction by causing the autonomous work machine 10 to turn, at a predetermined turn timing, in the turn direction determined by the determination unit C2.

In FIG. 3, reference symbol AR1 denotes an unworked area where the grass is long, and reference symbol AR2 denotes a worked area where the grass is short. The determination unit C2 determines the turn direction of the autonomous work machine 10 in accordance with the distribution of the target object obtained by the obtainment unit C1, and the control unit C3 controls the autonomous work machine 10 so that the autonomous work machine will turn, at the turn timing of the autonomous travel operation, in the turn direction determined by the determination unit C2. FIG. 3 shows an example in which the determination unit C2 has determined a direction that turns toward the side of the unworked area AR1 as the turn direction to an area with a high distribution of the target object and has set a track.

(Processing Procedure of Autonomous Work Machine 10)

Figure 4:
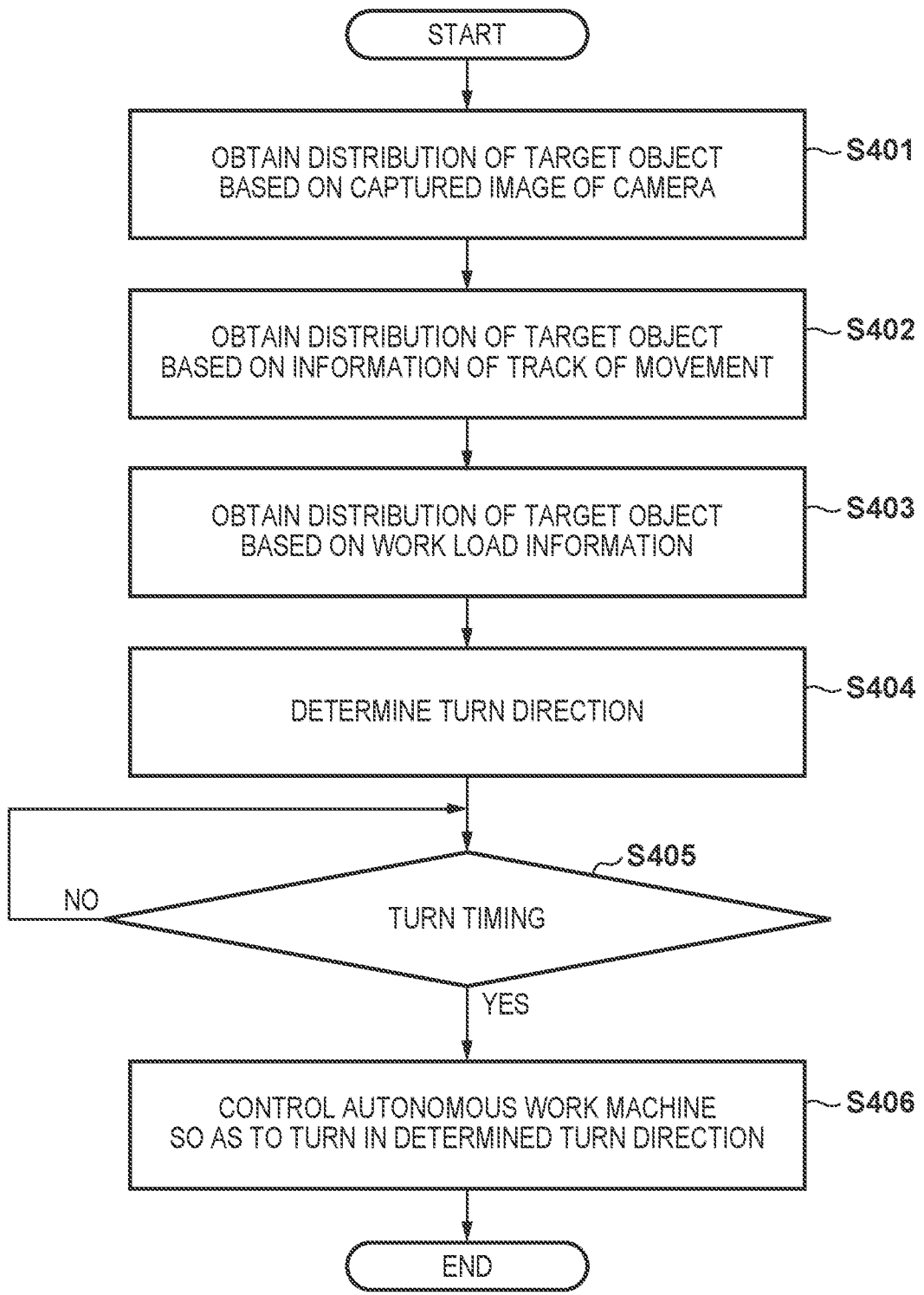
FIG. 4 is a flowchart for explaining the procedure of processing performed by the autonomous work machine.

FIG. 4 is a flowchart for explaining the procedure of processing executed by the autonomous work machine 10. The processing procedure of FIG. 4 is executed by the functional components (the obtainment unit C1, the determination unit C2, and the control unit C3) under the overall control by the ECU 44 of the autonomous work machine 10 shown in FIG. 2.

First, in step S401, along with the start of the movement of the autonomous work machine 10 from the charging station ST, the cameras 11 (11L and 11R) start image capturing of the work area AR. Each camera 11 can capture a moving image at a predetermined frame rate, and the image captured by each camera 11 (11L and 11R) is input to the ECU 44 and the obtainment unit C1 via the I/O 44b.

The obtainment unit C1 obtains the distribution of the target object based on the image of the work area captured by each camera 11. Based on the image processing of the image captured by each camera 11, the obtainment unit C1 discriminates a worked area where short grass is growing from an unworked area where long grass is growing by extracting grass portions from the image and comparing the densities of the grass portions in the image.

Each camera 11 may be a camera that captures the front of the autonomous work machine 10 or may be a camera which has an angle adjustment mechanism and can look 360° around the periphery of the autonomous work machine 10. As an example of the angle adjustment mechanism, for example, each camera 11 is held by a pan angle adjustment mechanism 11b for adjusting an angle in the horizontal direction and a tilt angle adjustment mechanism 11c for adjusting an angle in the vertical direction as shown in FIG. 1B. The ECU 44 (control unit C3) can control the angle of each camera 11 by controlling at least of the pan angle adjustment mechanism 11b and the tilt angle adjustment mechanism 11c, and obtain the information (information indicating the distribution of the target object) of the periphery of the autonomous work machine 10 based on image data captured by each camera 11. The timing for obtaining the information indicating the distribution of the target object is arbitrary. The information may be obtained by referring to information stored in the memory 44c (storage unit) in advance or may be obtained by the cameras 11 before the turn timing.

In step S402, the obtainment unit C1 obtains the distribution of the target object based on the information of the track of movement during the travel of the autonomous work machine 10. The obtainment unit C1 will specify, based on the track of movement of the autonomous work machine 10 which is traveling in the work area, a traveled area as a worked area and an untraveled area as an unworked area. Here, the obtainment unit C1 obtains the distribution of the work target object such as the fact that the distribution of the work target object (grass) is smaller in a traveled area (worked area) and that the distribution of the work target object (grass) is larger in an untraveled area (unworked area) than in the worked area.

In step S403, while the autonomous work machine 10 is traveling, the obtainment unit C1 obtains the information of a load (the load of the blade 20 or the load of the battery 32) of work on a work object (for example, grass) as the load history information together with the position information at the time of travel. The distribution of the work target object is obtained based on the load history information. Here, the obtainment unit C1 obtains, based on a predetermined threshold as a reference, the distribution of the work target object such as the fact that the distribution of the work target object (grass) is small in a low work load area (worked area) and that the distribution of the work target object (grass) is larger in a high work load area (unworked area) than in the worked area.

In step S404, the determination unit C2 determines, based on the distribution of the target object obtained by the obtainment unit C1, to set a direction with a high distribution of the target object as the turn direction with respect to the direction of travel of the autonomous travel operation. Here, the determination unit C2 determines the turn direction based on at least one of results of the processing (image processing) of step S401, the processing (movement track processing) of step S402, and the processing (work load processing) of step S403.

In step S405, the control unit C3 determines whether the turn timing of the autonomous travel operation has arrived. If it is determined that the turn timing has not arrived (NO in step S405), the autonomous travel operation by advancement will be continued. On the other hand, if it is determined that the turn timing has arrived (YES in step S405), the process will advance to step S406.

In step S406, the control unit C3 controls the autonomous work machine so that the autonomous work machine will turn, at the turn timing during the autonomous travel operation, in the turn direction determined by the determination unit C2.

(More Specific Example of Turn Control)
(Turn Control in Direction to Avoid Sharp Turn)

Figure 5:
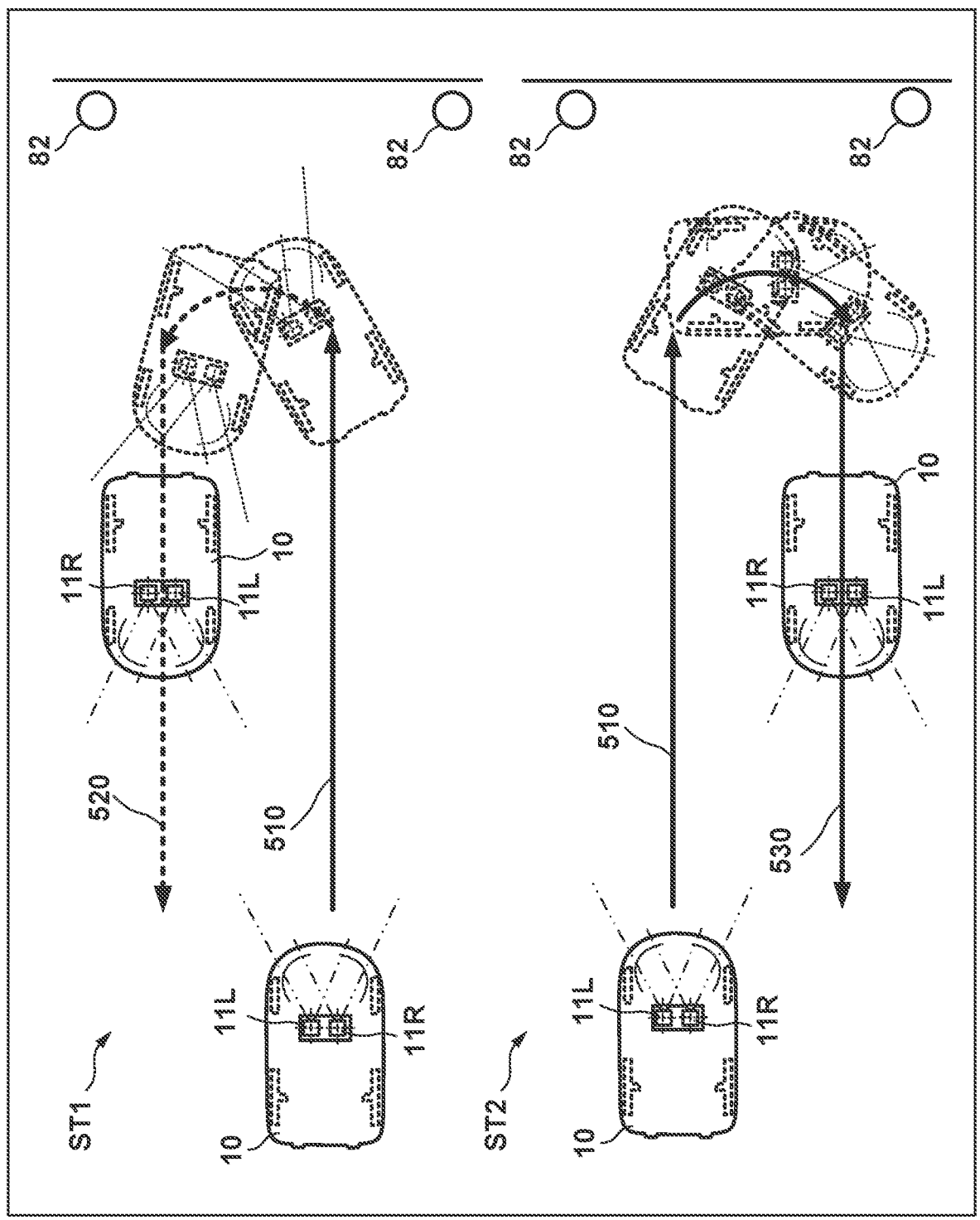
FIG. 5 is a view for explaining a specific example of turn direction control.

A more specific example of turn direction control will be described with reference to FIGS. 5 and 6. In FIG. 5, a state ST1 shows a state in which the autonomous work machine 10 traveling along a track 510 has turned (turned leftward with respect to the track 510) near the markers 82 and is traveling along a track 520. The determination unit C2 determines a direction with a high distribution of the target object as the turn direction from the direction of travel of the autonomous travel operation, and determines the turn angle. In the state ST1, the turn from the track 510 to the track 520 is a turn in the direction with a high distribution of the target object.

Even in the case of a turn in the direction with the high distribution of the target object, the load on the target object in the work area AR may increase if the turn is based on a sharp angle compared to a turn based on a predetermined angle. For example, the lawn may become peeled or the like if the target object is grass. In a case in which the turn (the turn from the track 510 to the track 520) in the turn direction determined by the determination unit C2 is to be a turn (sharp turn) based on a sharp angle compared to the predetermined angle, the control unit C3 will control the autonomous work machine 10 to turn (turn rightward with respect to the track 510) in a direction opposite to the turn direction. Here, a sharp turn includes a case in which the turn angle of each of the front wheels 14 (14L and 14R) of the autonomous work machine 10 becomes an angle sharper than the predetermined angle or a case in which the autonomous work machine is to turn on the current spot.

In FIG. 5, a state ST2 shows a state in which the autonomous work machine 10 traveling along the track 510 has turned (turn rightward with respect to the track 510) near the markers 82 and is traveling along a track 530. Here, the control unit C3 will control the travel of the autonomous work machine 10 so that the track (the track 530) after the turn will be parallel to the track (track 510) of travel before the turn. Since the autonomous work machine will be able to operate while traveling in a parallel track before and after the turn, lawn mowing can be performed without waste by preventing missed spots of grass.

In the turn shown in the state ST2, the turn will not be made at a sharp angle compared to the predetermined angle in the manner of the state ST1, and the autonomous work machine can turn from the track 510 to the track 530 based on a moderate turn angle compared to that in the state ST1. By performing such turn control, it will be possible to reduce the load on the target object that can occur due to a sharp turn. For example, it will be possible to prevent the lawn from peeling.

(Turn Start Timing Control)

Figure 6:
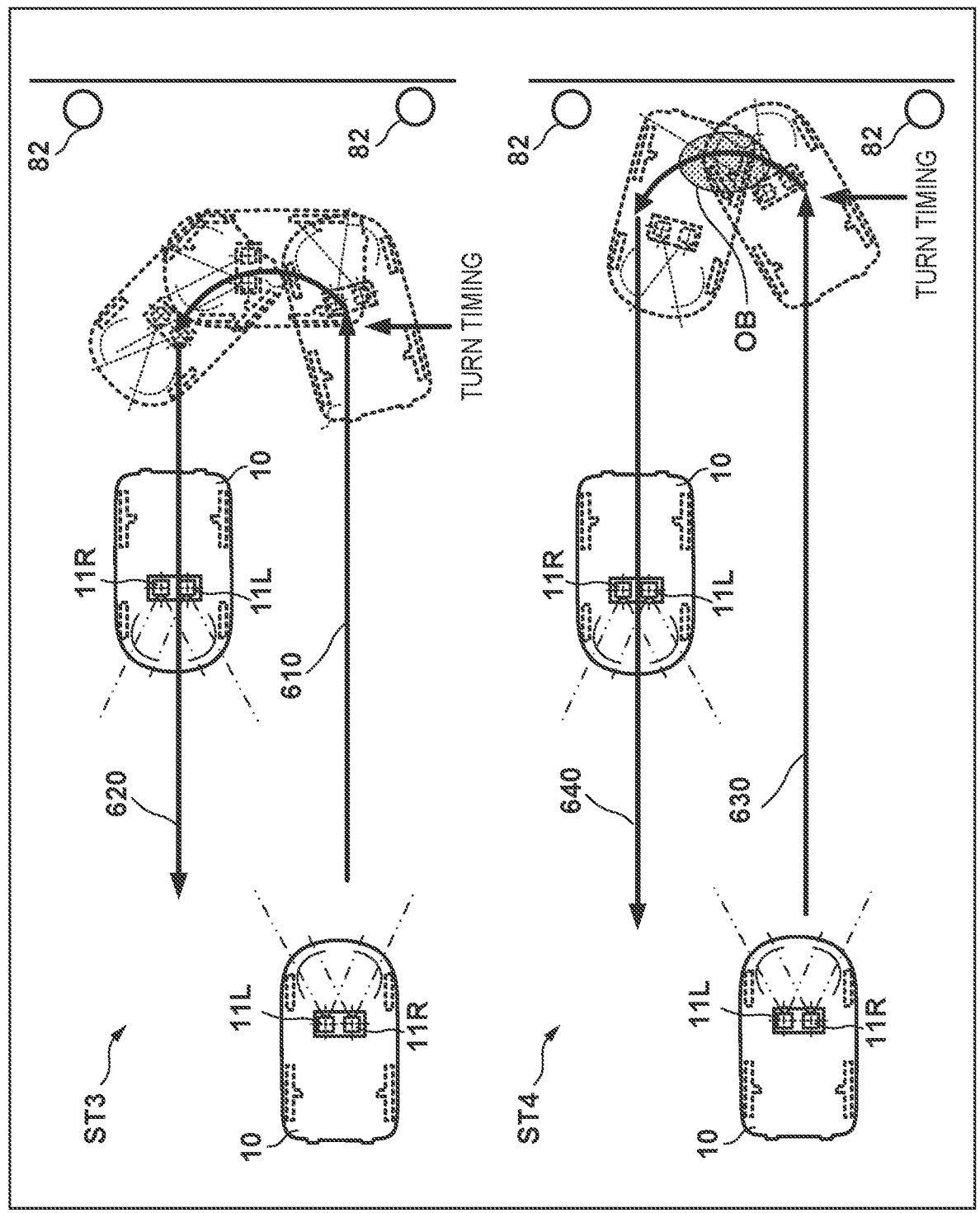
FIG. 6 is a view for explaining a specific example of the turn direction control.

In FIG. 6, a state ST3 shows a state in which the autonomous work machine 10 traveling along a track 610 has turned (turned leftward with respect to the track 610) near the markers 82 and is traveling along a track 620. The determination unit C2 determines, with respect to the direction of travel of the autonomous travel operation, a direction with a high distribution of the target object as the turn direction, and determines the turn angle. In the state ST3, a turn from the track 610 to the track 620 is a turn in the direction with a high distribution of the target object. The control unit C3 controls the travel of the autonomous work machine 10 so that the track (track 620) after the turn will be parallel to the track (track 610) before the turn. Since work can be performed while traveling in a parallel track before and after the turn, lawn mowing can be performed without waste by preventing missed spots of grass.

To reduce the load on the target object (for example, to prevent peeling of the lawn) in the work area AR, the control unit C3 controls a turn start timing so that the turn will be a moderate turn which is more moderate than a predetermined angle.

Here, since a missed spot of grass may be generated near the markers 82 if control is performed in the manner of the ST3 to prevent a sharp turn before the markers 82, the control unit C3 will determine the turn timing during the autonomous travel operation in accordance with the distribution of the target object. In FIG. 6, a state ST4 shows a state in which the autonomous work machine 10 travels near the markers 82 along a track 630, turns near the markers 82, and travels along a track 640 after the turn, in a case in which a missed spot OB of grass is present near the markers 82.

In the state ST4, the turn angle near the markers 82 can cause the autonomous work machine to turn at a sharper angle than the predetermined angle, but the control unit C3 will execute control to make the turn start timing be more delayed than that in the state ST3 to perform lawn mowing work in the missed spot OB of grass. That is, in the state ST4, the control unit C3 executes control to make the turn start timing be more delayed than the turn start timing in the state ST3.

By executing such turn control, in a case in which there is a distribution of the target object near the boundary of the work area AR (for example, the missed spot of grass), the autonomous work machine can travel near the boundary of the work area AR and turn after working (for example, performing lawn mowing work) on the target object. Hence, it will be possible to reduce an unworked area where the lawn mowing work has not been completed.

Note that the turn start timing control is not limited to this example. For example, in a case in which an obstacle (for example, a rock or the like in the work area AR) is present in the middle of the track 630, control can be performed to make the autonomous work machine turn earlier than the turn starting timing of the state ST3 to avoid the obstacle.

Other Embodiments

A program that implements the functions of one or more autonomous work machines described in the embodiment is supplied to a system or an apparatus via a network or a storage medium, and one or more processors in the computer of the system or the apparatus can load and execute the program. The present invention can also be implemented by such a mode.

Summary of Embodiment

Arrangement 1. An autonomous work machine according to the above-described embodiment is an autonomous work machine (for example, 10 of FIGS. 1A and 1B) that works on a target object in a work area while performing an autonomous travel operation in the work area, comprising:

an obtainment unit (for example, C1 of FIG. 2) configured to obtain a distribution the target object of the work;

a determination unit (for example, C2 of FIG. 2) configured to determine a turn direction of the autonomous work machine in accordance with the distribution of the target object; and a control unit (for example, C3 of FIG. 2) configured to control the autonomous work machine (10) so that the autonomous work machine will turn in the turn direction at a turn timing during the autonomous travel operation.

According to the autonomous work machine of Arrangement 1, the autonomous work machine can be controlled to turn in a direction corresponding to the distribution of the target object, and work efficiency can be improved.

Arrangement 2. In the autonomous work machine according to the above-described embodiment, the determination unit (C2) determines, as the turn direction, a direction with a high distribution of the target object with respect to a direction of travel of the autonomous travel operation.

According to Arrangement 2, the autonomous work machine can be controlled to turn in the direction corresponding to the distribution of the target object, and the work efficiency can be improved.

Arrangement 3. In the autonomous work machine according to the above-described embodiment, in a case in which a turn in the turning direction will be a turn based on a sharper angle than a predetermined angle, the control unit (C3) will control the autonomous work machine (10) to turn in a direction opposite to the turn direction.

According to the autonomous work machine of Arrangement 3, a load on the target object that can be generated by a sharp turn can be reduced. For example, peeling of the lawn can be prevented.

Arrangement 4. In the autonomous work machine according to the above-described embodiment, the control unit (C3) determines the turn timing of the autonomous travel operation in accordance with the distribution of the target object.

According to the autonomous work machine of Arrangement 4, by performing control so that the autonomous work machine will travel near the boundary of the work area AR and turn after working (for example, performing lawn mowing work) on the target object in a case in which there is a distribution (for example, a missed spot of grass) of the target object near the boundary of the work area AR, it will be possible to reduce unworked areas where the lawn mowing work has not been completed.

Arrangement 5. In the autonomous work machine according to the above-described embodiment, the control unit (C3) controls a travel operation of the autonomous work machine (10) so that a track of travel after the turn will be parallel to a track of travel before the turn.

According to the autonomous work machine of Arrangement 5, since the autonomous work machine can work while traveling on a parallel track before and after the turn, lawn mowing can be performed without waste by preventing missed spots of grass.

Arrangement 6. In the autonomous work machine according to the above-described embodiment, the determination unit (C2) specifies, based on the distribution of the target object obtained by the obtainment unit, an area where the distribution of the target object is biased in the work area, and determines, as the turn direction, a direction toward the specified region from the direction of travel of the autonomous travel operation.

According to the autonomous work machine of Arrangement 6, in a case in which an unworked area (for example, a missed spot area of grass) is concentrated in a single spot, the turn direction will be determined so that the autonomous work machine will move toward the area and work. As a result, the work can be performed at once, and the work efficiency can be further improved.

Arrangement 7. The autonomous work machine according to the above-described embodiment further comprises:

a camera (for example, 11 of FIG. 2) configured to capture the work area, wherein the obtainment unit (C1) obtains the distribution of the target object based on an image of the work area captured by the camera (11).

According to the autonomous work machine of Arrangement 7, the distribution of the target object can be obtained by processing an image captured by a camera.

Arrangement 8. In the autonomous work machine according to the above-described embodiment, the obtainment unit (C1) obtains, in addition to position information at a time of travel, work load information of the target object as load history information, and the determination unit (C2) specifies, based on the load history information, a high load area in the work area, and determines, as the turn direction, a direction toward the specified area from the direction of travel of the autonomous travel operation.

According to the autonomous work machine of Arrangement 8, by obtaining, in addition to the position information at the time of travel, the work load (the load of the blade 20 or the load of the battery 32) information as the load history information, an area with high load information can be estimated to be an unworked area (for example, an area with many missed spots of grass). Hence, the distribution of the target object can be obtained based on this estimation, and the turn direction can be determined.

Arrangement 9. In the autonomous work machine according to the above-described embodiment, in a case in which there are a plurality of areas where the distribution of the target object is biased in the work area, the determination unit (C2) sets a priority order (for example, 701 of FIG. 7) to each area in accordance with a degree of the distribution of the target object, and determines the turn direction based on the set priority order.

According to the autonomous work machine of Arrangement 9, in a case in which there are a plurality of areas where the distribution of the target object is biased, the turn direction can be determined based on a priority order which has been set in accordance with the degree (for example, the degree of the length of the grass or the work load information (the degree of load) of the distribution.

Arrangement 10. In the autonomous work machine according to the above-described embodiment, in a case in which the target object is determined, based on the image captured by the camera (11), to be in a state not requiring work, the determination unit (C2) will determine the turn direction by excluding, from an area of the work area, an area of the target object determined to be in the state not requiring work.

Dying of the grass may be promoted if lawn mowing work is performed on an area where the grass has died. However, according to the autonomous work machine of Arrangement 10, excluding the area where the grass has died from the work target area will allow the grass to be protected by suppressing the dying of the grass from being promoted.

Arrangement 11. In the autonomous work machine according to the above-described embodiment, the determination unit (C2) determines a turn angle, in the determined turn direction, based on the distribution of the target object, and the control unit (C3) controls the autonomous work machine (10) based on the turn direction and the turn angle determined by the determination unit (C2).

According to the autonomous work machine of Arrangement 11, the autonomous work machine can be controlled to turn in a direction corresponding to the distribution of the target object, and work efficiency can be improved.

Arrangement 12. A method of controlling an autonomous work machine according to the above-described embodiment is a method of controlling an autonomous work machine (for example, 10 of FIGS. 1A and 1B) that works on a target object in a work area while performing an autonomous travel operation in the work area, the method comprising:

an obtainment step (for example, S401 to S403 of FIG. 4) of obtaining a distribution the target object of the work;

a determination step (for example, S404 of FIG. 4) of determining a turn direction of the autonomous work machine in accordance with the distribution of the target object; and a control step (for example, S406 of FIG. 4) of controlling the autonomous work machine so that the autonomous work machine will turn in the turn direction at a turn timing during the autonomous travel operation.

According to a method of controlling the autonomous work machine of Arrangement 12, the autonomous work machine can be controlled to turn in a direction corresponding to the distribution of the target object, and work efficiency can be improved.

Arrangement 13. A program according to the above-described embodiment causes a computer (for example, 44a of FIG. 2) to function as each unit (for example, the obtainment unit C1, the determination unit C2, and the control unit C3 of FIG. 2) of an autonomous work machine defined in any one of Arrangements 1 to 11.

According to the program of Arrangement 13, a program that can function as each unit of the autonomous work machine can be provided.

The present invention is not limited to the above embodiments and various changes and modifications can be made within the spirit and scope of the present invention. Therefore, to apprise the public of the scope of the present invention, the following claims are made.

What is claimed is:

1. An autonomous work machine that works on a target object in a work area while performing an autonomous travel operation in the work area, comprising:

at least one processor circuit with a memory comprising instructions, that when executed by the processor circuit, causes the at least one processor circuit to at least:

obtain a distribution of the target object of the work;

determine a turn direction of the autonomous work machine in accordance with the distribution of the target object; and control the autonomous work machine so that the autonomous work machine will turn in the turn direction at a turn timing during the autonomous travel operation, wherein in a case in which a turn in the turn direction will be a sharp turn based on a sharper angle than a predetermined angle, the autonomous work machine is controlled to change the turn direction or the turn timing to prevent the sharp turn.

2. The autonomous work machine according to claim 1, wherein the turn direction is determined to be a direction with a high distribution of the target object with respect to a direction of travel of the autonomous travel operation.

3. The autonomous work machine according to claim 1, wherein in a case in which the turn in the turn direction will be the sharp turn, the autonomous work machine is controlled to turn in a direction opposite to the turn direction.

4. The autonomous work machine according to claim 1, wherein the turn timing of the autonomous travel operation is determined in accordance with the distribution of the target object.

5. The autonomous work machine according to claim 1, wherein a travel operation of the autonomous work machine is controlled so that a track of travel after the turn will be parallel to a track of travel before the turn.

6. The autonomous work machine according to claim 1, wherein, based on the distribution of the target object obtained by the obtainment unit, an area is specified where the distribution of the target object is biased in the work area, and the turn direction is determined to be a direction toward a specified region from the direction of travel of the autonomous travel operation.

7. The autonomous work machine according to claim 1, further comprising:

a camera configured to capture the work area, wherein the distribution of the target object is obtained based on an image of the work area captured by the camera.

8. The autonomous work machine according to claim 1, wherein, in addition to position information at a time of travel, work load information of the target object is obtained as load history information, and based on the load history information, a high load area in the work area is specified, and the turn direction is determined to be a direction toward the specified area from the direction of travel of the autonomous travel operation.

9. The autonomous work machine according to claim 1, wherein in a case in which there are a plurality of areas where the distribution of the target object is biased in the work area, a priority order is set to each area in accordance with a degree of the distribution of the target object, and the turn direction is determined based on the set priority order.

10. The autonomous work machine according to claim 7, wherein in a case in which the target object is determined, based on the image captured by the camera, to be in a state not requiring work, the turn direction is determined by excluding, from an area of the work area, an area of the target object determined to be in the state not requiring work.

11. The autonomous work machine according to claim 7, wherein a turn angle, in the determined turn direction, is determined based on the distribution of the target object, and the autonomous work machine is controlled based on the determined turn direction and the turn angle.

12. A method of controlling an autonomous work machine that works on a target object in a work area while performing an autonomous travel operation in the work area, the method comprising:

obtaining a distribution of the target object of the work;

determining a turn direction of the autonomous work machine in accordance with the distribution of the target object; and controlling the autonomous work machine so that the autonomous work machine will turn in the turn direction at a turn timing during the autonomous travel operation, wherein in a case in which a turn in the turn direction will be a sharp turn based on a sharper angle than a predetermined angle, the controlling will control the autonomous work machine to change the turn direction or the turn timing to prevent the sharp turn.

13. A non-transitory storage medium that stores a program for causing a computer to function as each unit of an autonomous work machine defined in claim 1.

* * * * *